United States Patent [19]

Pitroda et al.

[11] 3,920,921

[45] Nov. 18, 1975

[54] LINE EQUIPMENT FOR SCAN AND CONTROL SYSTEM FOR SYNCHRONIZED PCM DIGITAL SWITCHING EXCHANGE

[75] Inventors: Satyan G. Pitroda, Villa Park; Michael J. Kelly, Melrose Park, both of Ill.

[73] Assignee: GTE Automatic Electric Laboratories Incorporated, Northlake, Ill.

[22] Filed: Dec. 13, 1974

[21] Appl. No.: 532,540

[52] U.S. Cl. .............................................. 179/15 BF
[51] Int. Cl.$^2$ .............................................. H04J 3/12
[58] Field of Search .................................. 179/15 BF

[56] References Cited

UNITED STATES PATENTS

| | | | |
|---|---|---|---|
| 3,715,503 | 2/1973 | Jungbluth et al. | 179/15 BF |
| 3,830,982 | 8/1974 | Christiansen | 179/15 AE |

*Primary Examiner*—Thomas W. Brown
*Attorney, Agent, or Firm*—James V. Lapacek

[57] ABSTRACT

Among the line equipment serving a synchronized PCM TDM digital switching exchange, there is provided a supervisory scan and control system for interfacing the operation of incoming and outgoing line equipment with a common control stored program call processor unit. The supervisory scan and control system comprises a scan and control circuit and an alarm simulator circuit. The scan and control circuit is primarily concerned with interfacing two types of nonmessage information to be transmitted, namely, supervisory information (on-hook and off-hook) and signaling information (dial pulse). The alarm simulator circuit initiates a disconnect of all trunk circuits from service for the duration of an alarm condition such as a loss of synchronization or supply voltage and introduces a period of time delay required both for trunk disconnect and trunk restoration to service.

16 Claims, 11 Drawing Figures

LINE EQUIPMENT FOR SCAN AND CONTROL SYSTEM FOR SYNCHRONIZED PCM DIGITAL SWITCHING EXCHANGE

BACKGROUND

This invention relates generally to line equipment used with a synchronized PCM TDM digital switching exchange, and more particularly, relates to a novel supervisory scan and control system useful with such line equipment as employed in a common control stored program environment.

The present invention finds particular application in digital PCM tandem switching exchanges as the supervisory scan and control system for the incoming and outgoing line equipment. As commonly understood, the line equipment presents digital data in parallel format to and receives the same from appropriate group equipment and the interconnected crosspoint switching networks. The incoming line equipment used with the present invention employs a line synchronizer system for inserting timing corrections for propagational related fluctuations and is disclosed in a copending patent application U.S. Ser. No. 305,634, filed Nov. 10, 1972, now U.S. Pat. No. 3,825,683, on behalf of a common assignee and to which reference may be had for more detailed discussion. Also, there is discussed in the referenced copending application a method of and the importance of providing time synchronization in digital switching exchanges. In essence, for successful time switching, there must be continuous recognition of incoming channels and frames of the T-carrier digital transmission format. The line equipment disclosed herein makes use of the master-slave synchronization method of providing a master exchange clock oscillator at the master switching exchange and then slaving the D1 or D2 channel bank equipment of satellite switching exchanges to the exchange reference timing signals thus provided.

The line equipment is commonly understood to provide supervisory scan and control points for each channel of the PCM carrier data train, detect and control the PCM carrier alarm and restoral sequences, maintain frame alignment, compensate for propagation delay characteristics caused by line transmission temperature variations and phase jitter, via net loss VNL compensation for toll network requirements, and perform the serial/parallel/serial organization conversion. The supervisory scan and control system of the present invention is intended to provide for the first two of the aforementioned line equipment functions. The incoming line equipment receives serial carrier data and converts the data to parallel format for being processed as all same-number channels at once through the group equipment and switching network. The outgoing line equipment reconstructs the serial carrier data from the switched parallel data while inserting suitable framing and idle code data. The group equipment supermultiplexes the outputs from eight incoming line equipments to form a 192-channel inlet to the switching network and supermultiplexes the outputs from the network to the proper outgoing line equipment. A suitable arrangement for the group equipment will be described as a part of this application so as to provide the reader with the complete carrier processing equipment between an incoming PCM carrier trunk from a distant channel bank and the crosspoint PCM switching network or exchange.

The supervisory scan and control system is understood to be a part of the electronic interface circuits which serve as interfacing control means between the line equipment and the common control processor CPU and also various service circuits and the CPU. It is well known for PCM switching using a stored program system, that all switching equipment communicates with a common control complex by means of being accessed over a peripheral unit PU bus which carries information to and from the various subsystems under the direction of the central or common control. It is further thought that the operations of the common control complex with its functional elements such as logic, storage, processing and data access are well documented and described in connection with known PCM switching systems, and since the elements of the CPU used with applicant's present invention do not require more than this standard type CPU, the CPU operation will not be discussed at any length in this application.

The digital line equipment when employed with a common control stored program switching exchange having a standard call processor unit CPU must provide control means whereby there exists interface coordination of the operations of the incoming and outgoing line equipment with the operations of the CPU. To this end, the present invention provides CPU and line equipment interface control through the provision of a supervisory scan and control system comprised of a scan and control circuit or unit and an alarm simulator circuit or unit. The scan and control circuit or unit, hereinafter sometimes referred to as the supervisory control circuit, is essentially concerned with what is known as non-message information being transmitted, namely, supervisory (on-hook and off-hook) information and signaling information (dial pulse). While the supervisory scan and control system is equally applicable to be used with the D1 channel bank data format, the present invention is perferably described in connection with the D2 channel bank data format wherein the eight bit in every channel which occurs in the sixth repetitive frame is non-message and otherwise all eight bits serve to convey message information. The alarm simulator circuit is provided in case of a loss of synchronization or supply voltage and initiates a disconnect of all trunk circuits from service for the duration of an alarm condition and introduces a period of time delay required both for trunk disconnect and trunk restoration to service.

SUMMARY

It is therefore among the objects of the present invention to provide a control means as part of the electronic interface between the operations of the line equipments that connect digital data from and to a PCM switching exchange and the standard call processor unit of a common control stored program switching network; to provide a supervisory scan and control system in accordance with the above-stated object comprising in combination a supervisory control circuit and an alarm simulator circuit; and to provide a supervisory scan and control system capable of monitoring the non-message information being transmitted and initiating a disconnect or restoration to service of all trunk circuits when loss or regain of synchronization occurs, respectively.

A supervisory scan and control system for use with the line equipment of a synchronized PCM TDM digital switching exchange includes a scan and control circuit and an alarm simulator circuit, each functioning as an interface between the line equipment and the call processor unit of a common control stored program communication switching network. The scan and control circuit is comprised of all solid state logic circuitry and is used to selectively monitor non-message information of the PCM carrier data to be switched and to interface the same with the CPU unit. The CPU unit can address the supervisory control circuit to cause inhibit of further interfacing of non-message information for a predetermined time period. The alarm simulator circuit is comprised of all solid state logic circuitry and includes an alarm signal when loss of framing has been detected for more than a preselected time, another alarm signal for recognizing that digital information as being received is unacceptable and still another alarm signal for notifying a distant terminal equipment that the digital data being transmitted is out of synchronization.

In a preferred practice of the invention, the alarm simulator circuit is comprised of first counter means activated by loss of framing of the PCM carrier data train to provide a first alarm output when said loss of framing exceeds a time duration of approximately 10 milliseconds and a second alarm output when said loss of framing exceeds a time duration of approximately 350 milliseconds, said second alarm output being a system alarm receive signal effective to activate a disconnect of all incoming PCM pulse data for a preselected time period and further to activate insertion of a preselected identification code into the received PCM pulse data train, and a second counter means activated by said preselected code to provide a third alarm output when preselected code is detected for a duration in excess of 1 second, said third alarm output being a system alarm transmit signal effective to instruct a receiving PCM network of the loss of synchronization at the transmitting PCM switching network.

The supervisory scan circuit is comprised of first and second register store means interconnected to a call processor unit and PCM line equipments for receiving non-message related data from said PCM line equipments, respectively, each of said first and second register store means providing to said call processor unit a first output signal corresponding to each occurrence of said received non-message data, third register store means connected to said first register store means for selectively inhibiting further outputs thereof during a dial pulse transmission period occurring subsequently to said first output signal having been provided to said call processor unit, fourth register store means connected to said second register store means for selectively controlling the first output signal thereof, logic means selectively interconnecting said first through said fourth register store means with said call processor unit, and decoder means interconnecting said call processor unit and said logic means to decode an address word from said call processor unit for selectively enabling the interconnection of said logic means with said first register store means through said fourth register store means.

The first and second register store means comprise input and output signaling registers, respectively, each of which are provided with a plurality of register store circuits corresponding in number to the plurality of data channels presented by a single frame of the PCM pulse data train, timing means for selectively activating said register store circuits as the respective channel periods occur. The third and fourth register store means comprise an incoming dial pulse inhibit register and an outgoing signal control register, respectively, each of which are provided with a plurality of register store circuits corresponding in number to the plurality of input and output register store circuits, respectively. Data word means are provided as an input from said call processor unit to said inhibit and control registers for identifying a selected one of the input and output register store circuits to be inhibited and enabled, respectively. Address word means are also provided as an input from said call processor unit to said decoder means for identifying a selected one of the first register store means through the fourth register store means and a selected one of the register store circuits of which the same are comprised.

These and other objects and purposes of the present invention should become apparent from the description set forth in the following figures and attendant disclosure, to wit:

THE DRAWING

DETAILED DESCRIPTION

Figure 1:
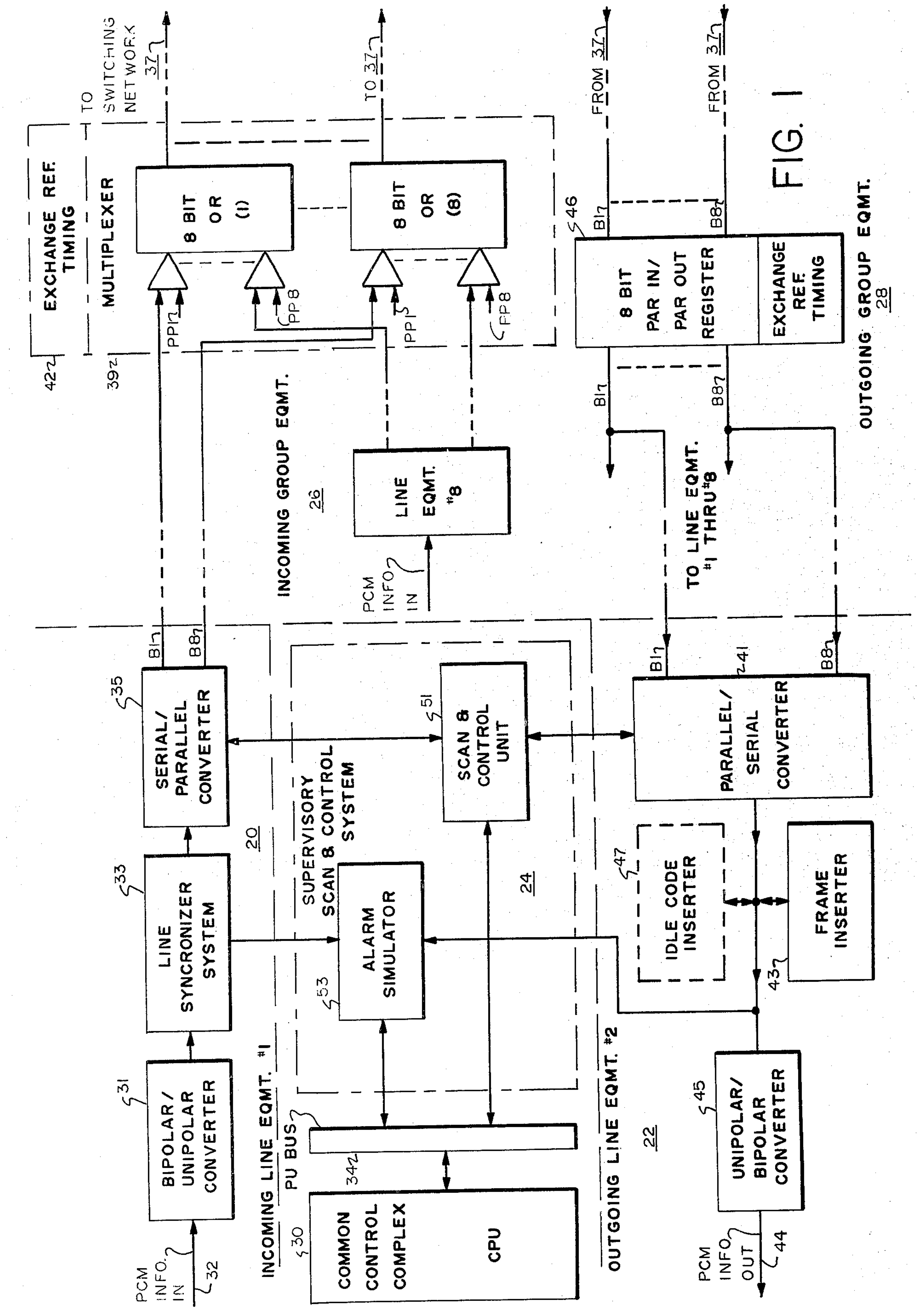
FIG. 1 is a functional block diagram of the line equipment and group equipment as might be employed in connection with a master PCM digital switching exchange and showing a supervisory scan and control system for use in conjunction with the line equipment.

There is shown in FIG. 1 the line equipment and the group equipment to be used with a frequency synchronized PCM TDM digital switching exchange. FIG. 1 shows only one set of line equipment, namely, incoming line equipment No. 1 at 20, outgoing line equipment No. 1 at 22, and a supervisory scan and control system at 24; however, it should be noted that the available digital T-carrier format of both D1 and D2 channel bank equipment will permit up to eight sets of such line equipment to be multiplexed and demultiplexed by a single set of group equipment. The group equipment consists of incoming group equipment 26 and outgoing group equipment 28 which constitutes a set of group equipment. A common control complex 30 including a common control stored program call processor unit CPU is shown in communication with the supervisory scan and control system 24 through the interconnection of a peripheral unit PU access bus shown at 34. In the interest of brevity and while providing a full and adequate description of the invention, only the detailed operation of a single set of line equipment will be set forth hereinafter. Accordingly, the incoming line equipment 20 is comprised of a bipolar to unipolar converter 31 which receives a digital bipolar 50% duty cycle pulse train 32 preferably arranged in the D2, T1 carrier format, a line synchronizer system 33 which receives the unipolar pulse train 32 and corrects for any phase deviations of the frame synchronized pulse train caused by line variations resulting from so-called phase jitter and changes in cable temperature, and a serial to parallel converter 35 for use in rearranging the T-carrier format for suitable presentation to the incoming group equipment 26. The detailed operations of and logic circuits for the bipolar to unipolar converter 31 and the serial to parallel converter 35 will not be given as these are standard units. The operation of and circuitry for the line synchronizer system are set forth in the above-referenced copending application. The serial to parallel converter 35 utilizes an eight bit serial to parallel shift register for presenting parallel information to the incoming group equipment 26 and on to a suitable cross-point matrix or network 37. The switching network is constructed so as to process only parallel arranged information multiplexed within a multiplexer 39 from the eight different sets of line equipment.

The outgoing line equipment 22 is comprised of a parallel to serial converter 41 for receiving parallel presented data from the outgoing group equipment 28 and converting the same to an outgoing serial pulse data train 44, a frame inserter 45 for inserting framing information since framing information is not processed through the switching network 37 and a unipolar to bipolar converter 45 utilizing the well known blocking oscillator concept as provided in the transmit portion of standard channel bank equipment. In addition, there is provided an idle code inserter 47 when the D1 transmission format is utilized.

During an idle channel period, there is no information switched through the network 37. The switching network 37 hence provides a pattern of all binary "ones" indicating that the memory circuit of the highway junctor was not accessed. The idle channel must be recognized by the outgoing line equipment 22 and a compatible idle code inserted in the transmission format. Basically, the idle code function continuously interrogates the signaling bit and when an idle condition is detected, the proper idle code is inserted. The idle code for the D1 transmission format is quantized to level 64 and for D2 format, is quantized to level 255. Hence, the idle code inserter is not required for the D2 format since the idle code 255 already corresponds to all "ones" as provided by the switching network during an idle channel. For this reason, the idle code inserter 47 is indicated as not required for the D2 transmission format by being shown in dashed outline.

As for the frame inserter 43, the switching network 37 is idle during the framing time of the transmission format, and thus the framing code must be inserted into the outgoing serial pulse train 44 for successful synchronous operation. The frame inserter 43 generates a signal framing channel and a terminal framing channel through inhibiting the outgoing PCM pulse train 44 for an appropriate time slot in every frame period and inserting a pattern of "one-one-one, zero-zero-zero" for the signal framing channel and an alternate "one-zero" pattern for the terminal framing channel. Since the entire transmission loop from the master switching exchange to the channel bank or terminal equipment and back again is time synchronized, all outgoing PCM lines may have the framing format inserted during a common timing slot.

The operation of the multiplexer unit 39 of the incoming group equipment 26 is shown at 42 to be interrelated with the master exchange reference timing as is to be expected of the computer-controlled frequency synchronized PCM switching exchange being disclosed. The multiplexer unit 39 basically consists of eight 8-bit or input OR logic gates 1 through 8 having eight parallel inputs from eight sets of line equipment arranged as shown in FIG. 1. The inputs PP1 through PP8 are timing pulses which correspond in time sequence to eight time (bit) slots within a given channel period and relate to the eight sets of line equipment. The timing pulses enable the acceptance of a selected set of line equipment by the multiplexer unit 39. The parallel binary outputs of the line equipment are represented in the drawing by the symbols B1–B8. Likewise, the output group equipment 28 is controlled in accordance with the master exchange reference timing and essentially comprises an 8-bit parallel in to parallel out register unit 46. The switching configuration contemplated for use with the equipment shown in FIG. 1 requires eight bits to be presented in parallel form; however, it is to be understood that other switching configurations could as well be used which would require a combination of serial to parallel bits such as two serial bits presented on each of four parallel leads.

Now in accordance with the invention, the operations of the incoming and outgoing line equipment 20 and 22 are coordinated with the common control call processor unit CPU 30 through the supervisory scan and control system 24. The supervisory scan and control system 24 comprises a scan and control circuit 51 and an alarm simulator circuit 53. The supervisory control circuit 51 is intended for interfacing two types of non-message information being transmitted, namely, supervisory data such as on-hook and/or off-hook and signaling data such as dial pulse. The alarm simulator circuit 53 is provided in case of a loss of synchronization or supply voltage and initiates a disconnect of all appropriate trunk circuits from service for the duration of an alarm condition. Further, the alarm simulator circuit 53 introduces the time delay required for trunk disconnect and trunk restoration to service.

Figure 2:
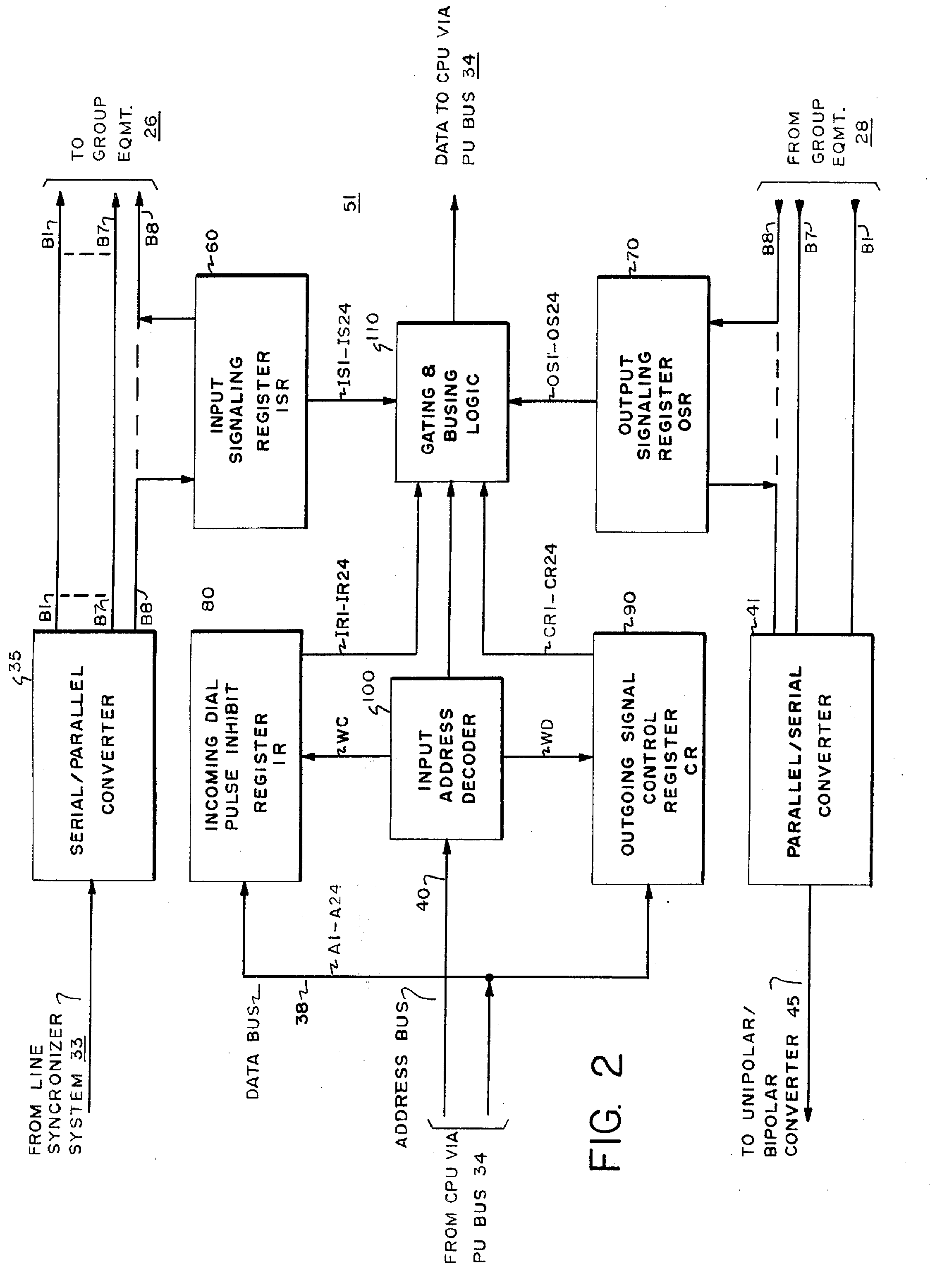
FIG. 2 is a block diagram of a detailed scan and control circuit or unit which is part of the supervisory scan and control system.

FIG. 2 shows the composition of the supervisory control circuit 51 comprising input and output signaling registers 60 and 70, respectively, each being in the form of a 24-bit register store circuit, an incoming dial pulse inhibit register 80 and an outgoing signal control register 90 each in the form of a 24-bit register store circuit, an input address decoder 100, and gating and busing logic circuitry 110. The gating and busing logic 110 provides signals to the CPU 30 when non-message data is received as is shown by output lead 36. The CPU sends responsive control signals to the supervisory control circuit 51 through a DATA bus 38 connected to the inhibit register 80 and the control register 90 and through an ADDRESS bus 40 connected to the input address decoder 100. As was previously stated, the D2 transmission format normally utilizes the least significant (eighth) bit from each of 24 voice sample channels every sixth frame period to convey supervisory information. Where two separate channels such as channels A and B are utilized within a switching system, the supervisory information is simply time-shared every sixth frame such that a particular channel has supervisory signaling in each twelfth frame period. For the present switching system under discussion, a single information channel format will be assumed.

Figure 3:
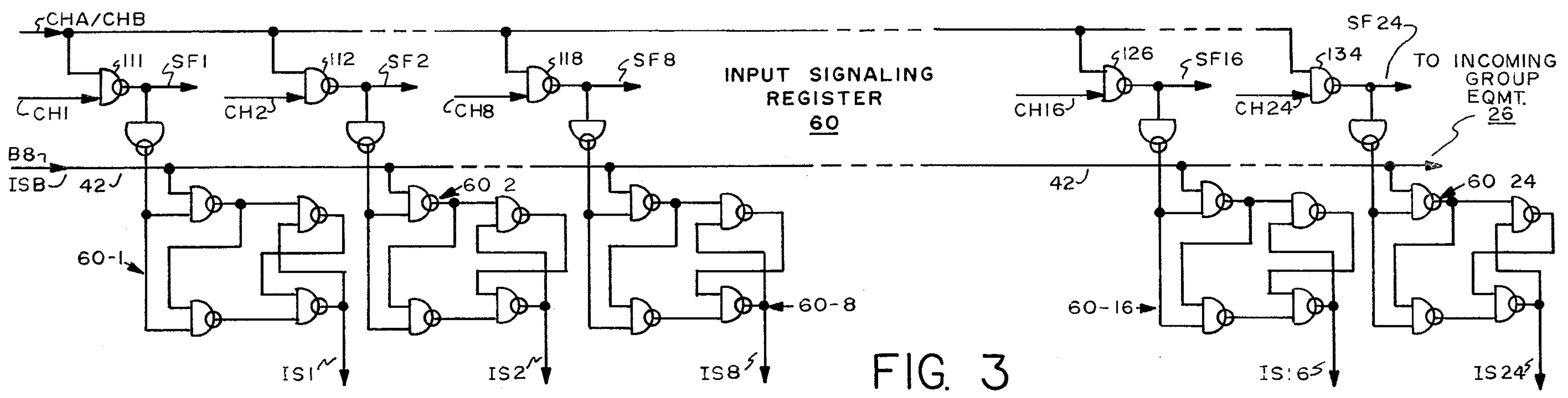
FIG. 3 is a logic circuit representation of an input signaling register unit for the scan and control circuit.

Fundamentally, the input signaling register 60 FIG. 3, sometimes denoted as ISR, receives only the signaling information from the serial to parallel converter 35. The voice information is transmitted in seven bit B1–B7 parallel format to the incoming group equipment 26 during the signaling frames and is transmitted in eight bit B1–B8 parallel format during non-signaling frames as is indicated by the dashed continuation of the B8 line in FIG. 2. It can be seen in FIG. 2 that the eighth bit B8 supervisory information is presented to the input signaling register 60 before being made available to the group equipment 26. This is done so as to enable the supervisory control circuit 51 to interface the supervisory information of the 24 channels with the CPU unit 30 as through the gating and busing logic 110 over the output lead 36. The serial to parallel converter presents the parallel outputs B1–B8 to the incoming group equipment 26 for one complete channel period of approximately 5.2 us.

The input signaling register 60 as shown in FIG. 3 is comprised of 24 independent register store circuits 60-1 through 60-24 being inputted by the common signal lead B8. During the signaling frame, the on-hook/off-hook information is written into the register store circuits 60-1 through 60-24. The 24 register store circuits are arranged by the gating of input NAND logic gates 111 through 134 to correspond to the 24 channels of a repeating time frame. Each incoming supervisory signal bit ISB for the 24 channels appears sequentially on the signal lead B8 in FIG. 3, and is inputted into the correspondingly associated register store circuit 60-1 through 60-24 only when suitably timing signals CH1 through CH24 representing the start time of the proper channel and either channel A or channel B, respectively, are provided to the two input NAND logic gates 111 through 134, respectively. When utilizing only one information channel, such as Channel A, as was earlier assumed, the channel timing signals can be inputted directly to the associated register store circuit 60-1 through 60-24. As shown in FIG. 3, only the circuits 60-1, 60-2, 60-8, 60-16 and 60-24 and the NAND logic gates 111, 112, 118, 126 and 134 are shown in order to illustrate 24 circuits. The respective signals IS1 through IS24 from the input signaling register store circuits 60-1 through 60-24 are provided at a selected d-c level and are connected to the gating and busing logic 110 for permitting addressing access by the computer-controlled CPU unit 30, only the signals IS1, IS2, IS8, IS16 and IS24 actually being shown in FIG. 3. The logic states of the NAND gates 111 through 134 are provided as output signals SF1 through SF24, respectively, which signals SF1–SF24 are used in the input signaling register circuitry of FIG. 9 in the development of supervision through signaling to the network 37 as will be set forth hereinafter in greater detail.

Figure 4:
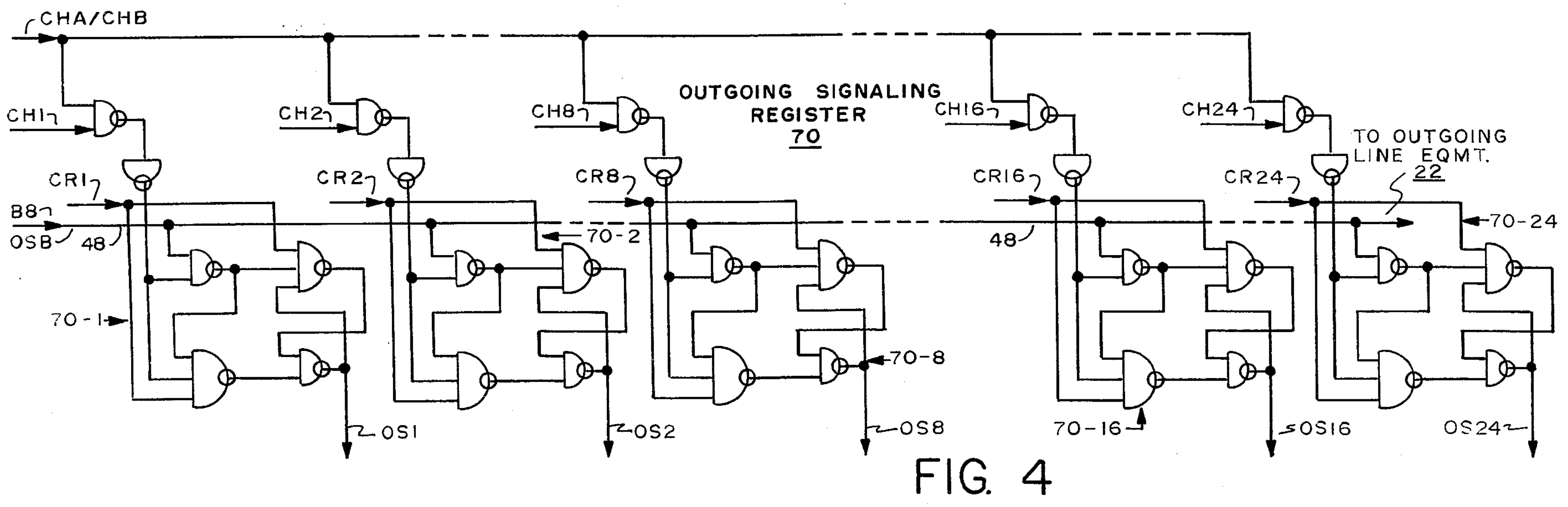
FIG. 4 is a logic circuit representation of an output signaling register unit for the scan and control circuit.

The output signaling register 70 of FIG. 4, sometimes hereinafter referred to as OSR, is a 24-bit register store circuit similar in its arrangement to the input signaling register 60. Accordingly, there is shown in FIG. 4 register store circuits 70-1, 70-2, 70-8, 70-16 and 70-24 which are representative of 24 such register store circuits 70-1 through 70-24. After the signaling and voice information is switched through the network 37, the data appears as B1–B8 in parallel format to the group equipment 28. The outgoing group equipment 28 presents the parallel channel information B1–B8 to the parallel to serial converter 41 of the outgoing line equipment which is then outputted as serial PCM information over lead 44. The eight bit appears as the supervisory bit in every sixth frame period, as previously stated, and as such is presented to the output signaling register 70 during the appropriate time periods over the output lead 48 of FIG. 2. Again channel timing signals CHA or CHB and a selected one of CH1 through Ch24 are shown in FIG. 4 to enable the register store circuits 70-1 through 70-24 to receive the sequentially presented outgoing supervisory signal bits OSB from the outgoing group equipment 28 over the common signal lead 48. The output signaling register store circuits 70-1 through 70-24 are provided with control register inputs CR1 through CR24, respectively, to provide the control over the outgoing signaling information. The respective output signals OS1 through OS24 from the output signaling register store circuits 70-1 through 70-24 are provided at a particular d-c level and are connected to the gating and busing logic 110 for permitting addressing access by the CPU unit 30 as will be illustrated in connection with FIG. 8.

Figure 5:
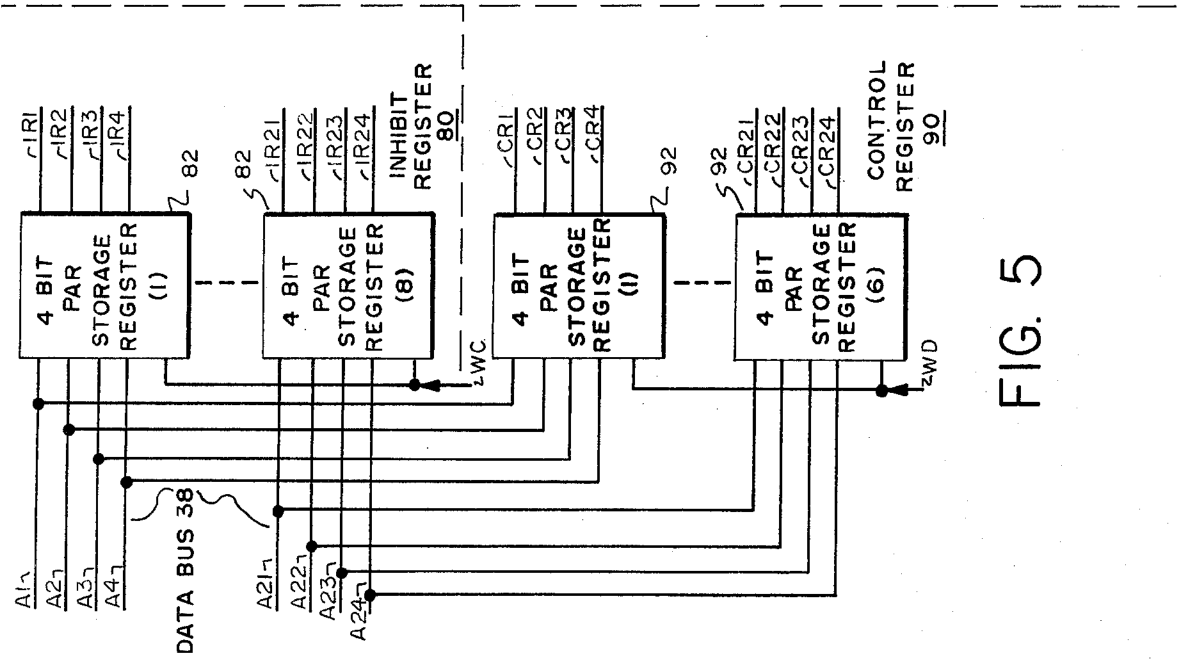
FIG. 5 is a logic circuit representation of an inhibit register unit and a control register unit for the scan and control circuit.

FIG. 5 shows the logic circuitry for the inhibit register IR 80 and the control register CR 90 and the respective logic output signals of each, namely, IR1 through IR24 and CR1 through CR24, respectively. The inhibit register IR 80 is comprised of a 24 bit parallel in to parallel out register store circuit implemented in the drawing in the form of six 4-bit parallel store registers 82. The logic output signals IR1 through IR24 are provided in parallel format to the gating and busing logic circuitry 110 as is shown in FIG. 2 and as will be set forth hereinafter in greater detail in connection with FIGS. 7 and 8. The inhibit logic output signals are initiated by the receipt of 24 data signals A1 through A24 provided in parallel from the CPU 30 over the DATA bus 38. The function of the inhibit output signals IR1 through IR24 is to control computer access of the input signal register ISR 60 through the use of an inhibit instruction from the CPU 30 in accordance with the prior receipt of an off-hook supervisory signal. Likewise, the control register 90 is comprised of a 24 bit parallel in to parallel out register store circuit implemented in the drawing in the form of six 4-bit parallel store registers 92. The logic output signals CR1 through CR24 are provided to the output signal register OSR 70, and more particularly to the gates 70-1 through 70-24 thereof, as is shown in FIG. 4. The control logic signals CR1 through CR24 are associated with the gates 70-1 through 70-24 to command the release of output signals OS1 through OS24, respectively. For example, the IR8 signal when provided as a part of a 24 bit parallel word consisting of IR1 through IR24 would function to inhibit the input signal gate 60-8 through the logic circuitry shown in FIG. 7. In a similar manner, the CR8 signal from the control register 90 would be gated to the output signal register gate 70-8 to command the generation of the output OS8. The DATA bus 38 provides the data input signals A1 through A24 to the inhibit control register IR 80 and CR 90 as simultaneous operation; however, it is not thought to be required to disclose the precise manner in which the programming operation of the CPU 30 would be able to accomplish this since it is well within the state of the art. It is to be noted, however, that an inhibit write command WC must also be supplied from the input address decoder 100 to the inhibit register IR 80 before signals A1 through A24 are effective to provide the output signals IR1 through IR24. Similarly, the input address decoder 100 must provide to the control register 90 a control write command WD to enable the data signals A1 through A24 to elicit the development of the control logic output signals CR1 through CR24.

The CPU unit 30 monitors the status of the incoming channels of the PCM pulse train 32 in order to detect an originating call for service (off-hook). When an off-hook condition is detected, the CPU unit 30 must be isolated from detecting further status changes caused by dial pulse transmission as these changes may be incorrectly interpreted as on-hook, off-hook status changes for the incoming channel. Therefore, the incoming dial pulse inhibit register 80 (sometimes referred to as IR) is used to inhibit the readout of these changes in the incoming channel of the incoming signaling register 60 during dial pulse transmission. At such time as the CPU 30 records a status change corresponding to off-hook, the CPU is caused to provide the 24-bit data word comprised of the data signals A1–A24 over the DATA bus 38 in FIG. 2 to the inhibit register 80. The CPU 30 is not disclosed in detail herein, nor is this required in order to fully explain the operations of applicant's invention so long as that portion of the CPU's operation which does enable it to exercise control of the supervisory scan and control system 24 is adequately set forth. Typical programs for other functions of the CPU may be found in the Bell System Technical Journal, Sept. 1964, on the pages shown in Table I. It should be understood that the total CPU 30 operation of the common control complex is much more comprehensive and is clearly outside of the scope of the present invention. Further, applicant's disclosures are not presented in particular computer language or format because this is a matter of choice of application and is well within the state of the art. However, applicant does disclose herein the total manner in which the CPU 30 may be used to access and receive signals from the supervisory system 24 through the address bus 40, data bus 38 and output lead 36. Additionally, there are sequence operations within a typical call sequence which do utilize the signal registers 60-1 through 60-24 but only to pass a change in logic state through the network 37, e.g., the signals SR1–SR24 as discussed in connection with FIGS. 9 and 10. Since the CPU 30 is not involved in a "through" operation, no program steps are illustrated in connection therewith.

The following Table I gives a typical or exemplary call sequence for the purpose of indicating the particular portion of the disclosed circuitry of the drawing that is involved in each call, to wit:

TABLE I

SIMPLIFIED CALL SEQUENCE

| STEPS | Circuitry Ref. | |
|---|---|---|
| 1. Scan for origination | ISR 60 ; | |
| 2. Trunk translation | CPU; | p. 2538 |
| 3 Retrun delay dial | CR 90; | |
| 4. Dial pulse search & connect | IRS 60 thru; | |
| 5. Inhibit incoming supervision | IR 80 ; | |
| 6. Remove delay dial (start dial) | CR 90 ; | |
| 7. Digit collection | ISR 60 thru; | p. 2517–20 |
| 8. Disconnect receiver inhibit | IR 80 ; | |
| 9. Translation | CPU; | p. 2540 |
| 10. Outgoing trunk selection & seizure | CR 90; | |
| 11. Accept delay dial | ISR 60; | |
| 12. Sender selection & connection | CPU; | |
| 13. Accept start dial | ISR 60; | |
| 14. Remove sender & cut thru network path | CPU; | |
| 15. Detect disconnect | ISR 60; | |
| 16. Remove network path | CPU. | |

Hence, where the indication is given in Table I, the disclosed circuitry of this invention is not involved and no programming information is furnished herein. Where the notation "through" is given in Table I, the input signal register is used to signal through the switching network 37 but no outputs such as IS1–IS24 are provided for generating CPU output data. Accordingly, it is seen in Table I that of 17 steps for the call sequence, the disclosed circuitry of the supervisory system 24 is utilized during ten of the steps and appropriate programming steps are hereby given.

The first step of the call sequence is "scan for origination " and employs the input signaling register ISR 60 by changing the logic state of a predetermined channel logic gate 60-*x* from a zero logic state to a one logic state to indicate the change of the off-hook subscriber condition. The CPU 30 must go through a scan sequence for detecting the change of state within the input register 60, for example:

Scan for Origination Program Sequence

1. Read line input signaling register ISR 60;
2. Read processor store memory (last look state of ISR);
3. Write processor store memory with information from step 1 to update last look state of ISR;
4. Transfer unequal (present information versus last look information) to work routine to analyze data;
5. Index address counter;
6. Transfer out of scan routine when complete; and
7. Return to beginning of scan routine.

Hence, the purpose of the above program sequence is to detect a mismatch in value of an assigned channel store register within the input signaling register ISR 60 and to transfer if detected unequal to the CPU 30.

It is seen from Table I that the control register CR 90 is utilized during the third step of "return delay dial", and the following program sequence is given:

Return Delay Dial Program Sequence

1. Obtain address of control register CR 90;
2. Read status of CR 90;

3. Change bit identified with assigned channel in the word representing CR 90 to then read "transmit off-hook" state; and
4. Write CR 90 with new word from step 3.

The other applicable program sequences are as follows:

Inhibit Incoming Supervision Sequence

1. Obtain address of inhibit register IR 80;
2. Read status of IR 80;
3. Change bit identified with assigned channel in the word representing IR 80 to then read "inhibit incoming supervision" state; and
4. Write IR 80 with new word from step 3.

Remove Delay (start dial) Sequence

1. Obtain address of control register CR 90;
2. Read status of CR 90;
3. Change bit identification in word for CR 90 to read "allow through supervision" state; and
4. Write CR 90 with new word from step 3.

Note: The above program steps are the same as for return delay dial sequence since the CPU 30 is merely changing the logic state.

Disconnect Receiver Inhibit Sequence

1. Obtain address of inhibit register IR 80;
2. Read status of IR 80;
3. Change bit identification in word for IR 80 to read "remove inhibit incoming supervision", and
4. Write IR 80 with new word from step 3.

Outgoing Trunk Selection and Seizure

1. Obtain address of control register CR 90;
2. Read status of CR 90;
3. Change bit identification in word for CR 90 to read "seize and select outgoing trunk"; and
4. Write CR 90 with new word from step 3.

The accept delay dial sequence, the detect disconnect and the accept start dial sequences are the same sequence as is given previously for the scan for origination sequence. Further, the following diagram sets the above sequencing information into a flow chart type pattern presented for additional clarity; however, it should be noted that specific programming codes are not presented because of a variety of program languages and codes that can possibly be implemented, and there are a variety of call processor units that could be employed to implement applicant's invention.

Exemplary Call Sequence Flow Pattern

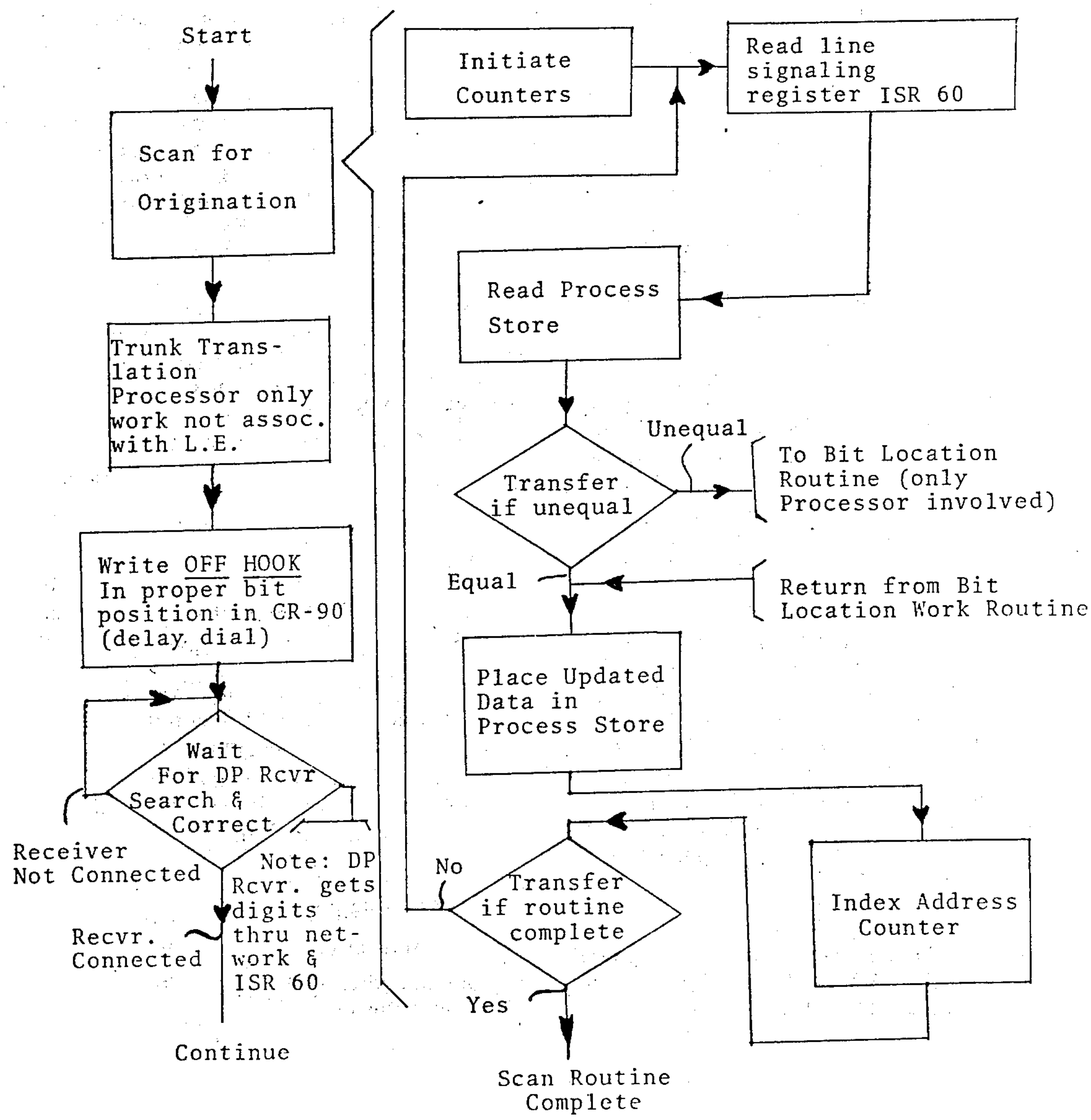

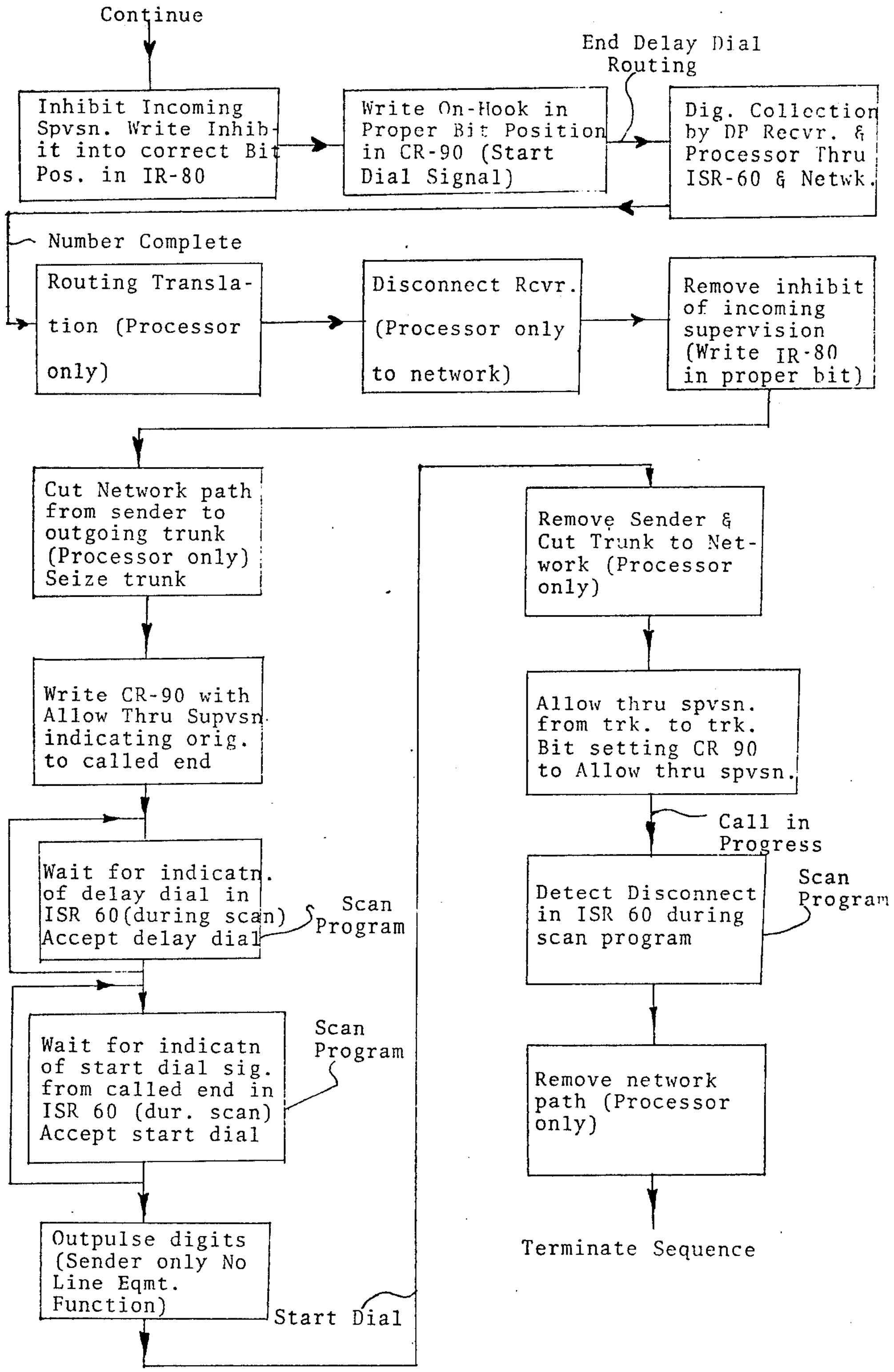

Figure 6:
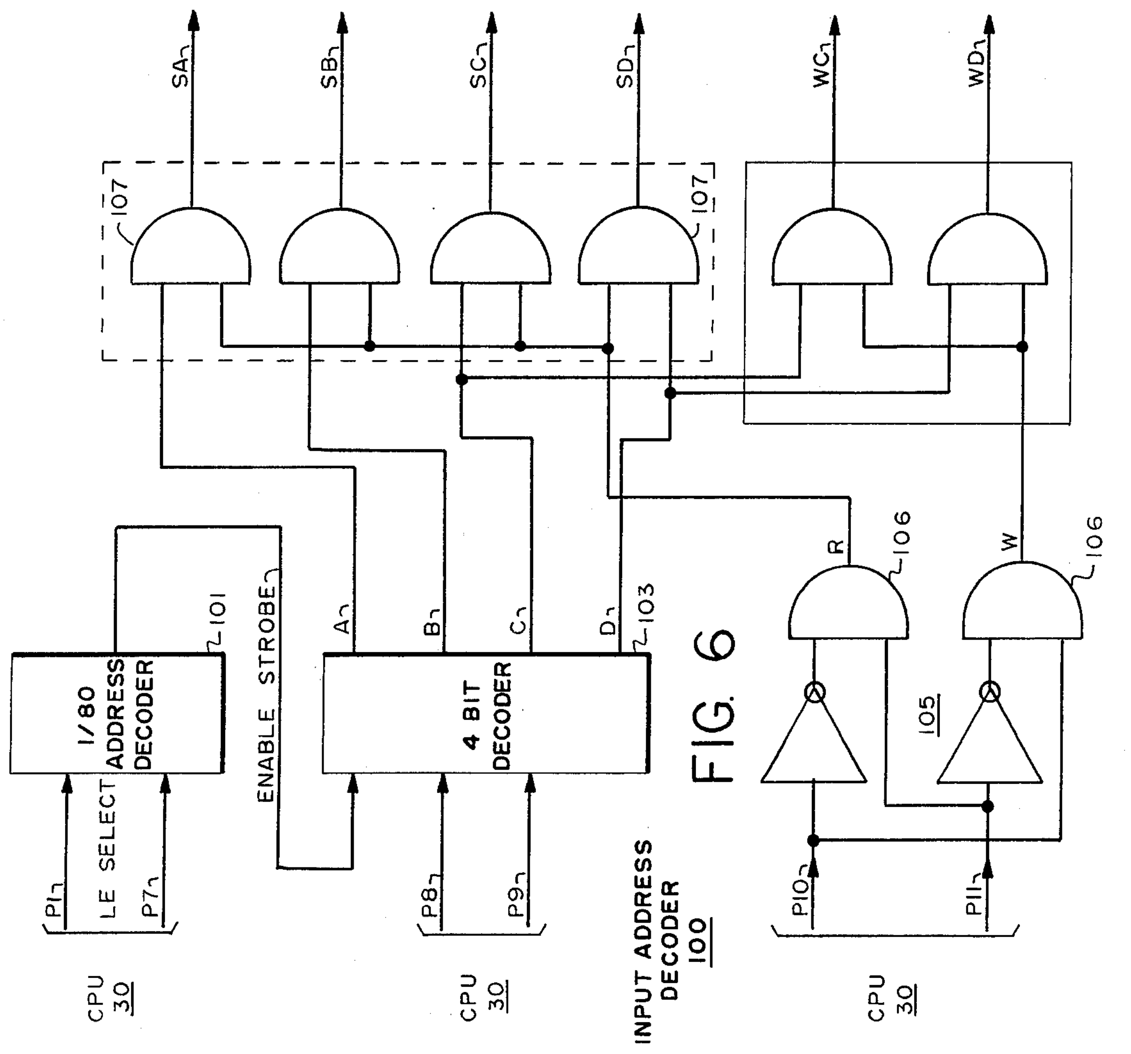
FIG. 6 is a logic representation of an input address decoder circuit for the scan and control circuit.

FIG. 6 shows the input address decoder circuit 100 wherein there is developed read and write commands used to signal appropriate responses in the inhibit and control registers IR 80 and CR 90 and the gating and busing logic 110. The CPU 30 communicates with the address decoder circuit 100 by providing an address word on the ADDRESS bus 40 as shown in FIG. 2. The address word is comprised of 11 bits, the first seven of which are used to identify the particular incoming line equipment set out of a possible 80 separate line equipments that could be employed with the digital switching exchange of FIG. 1, two additional bits are used to identify the access selection of either one of the inhibit register IR 80, the control register CR 90, the input signaling register ISR 60 and the output signaling register OSR 70, and two other bits are used to select either one of the read function or write function.

The seven address bits used to identify the line equipment are shown in FIG. 6 as P1 through P7 being inputted to a 1 out of 80 address decoder ciriut 101 of standard configuration such as might be available from a circuit manufacturer such as Texas Instruments, Inc. The output of the decoder circuit 101 is provided as an enable strobe to a 2-bit decoder circuit 103 which receives two address bits P8 and P9 that are used to select one of the four registers IR 80, CR 90, ISR 60 and OSR 70 for being accessed by the CPU 30. A typical 2-bit decoder circuit would be provided by using one-half of a 4-bit decoder circuit as might be available from a circuit manufacturer such as Texas Instruments, Inc. Two address bits P10 and P11 are provided to a gating arrangement 105 having two AND logic gates 106 whose outputs are the read enablement signal R and the write enablement signal W, respectively. The read signal is gated to four AND logic gates 107 to provide the outputs SA, SB, SC and SD which are the read access instructions from the CPU 30 to the input signaling register ISR 60, the output signaling register OSR 70, the inhibit register IR 80 and the control register CR 90, respectively. The access signals SA–SD are shown again in FIG. 8 as they are applied to the gating and busing logic 110. A single input address decoder circuit 100 has the capacity to be applied to up to 80 line equipments or 10 group equipments, or if preferred, one decoder circuit 100 could be used with each group equipment.

Figure 8:
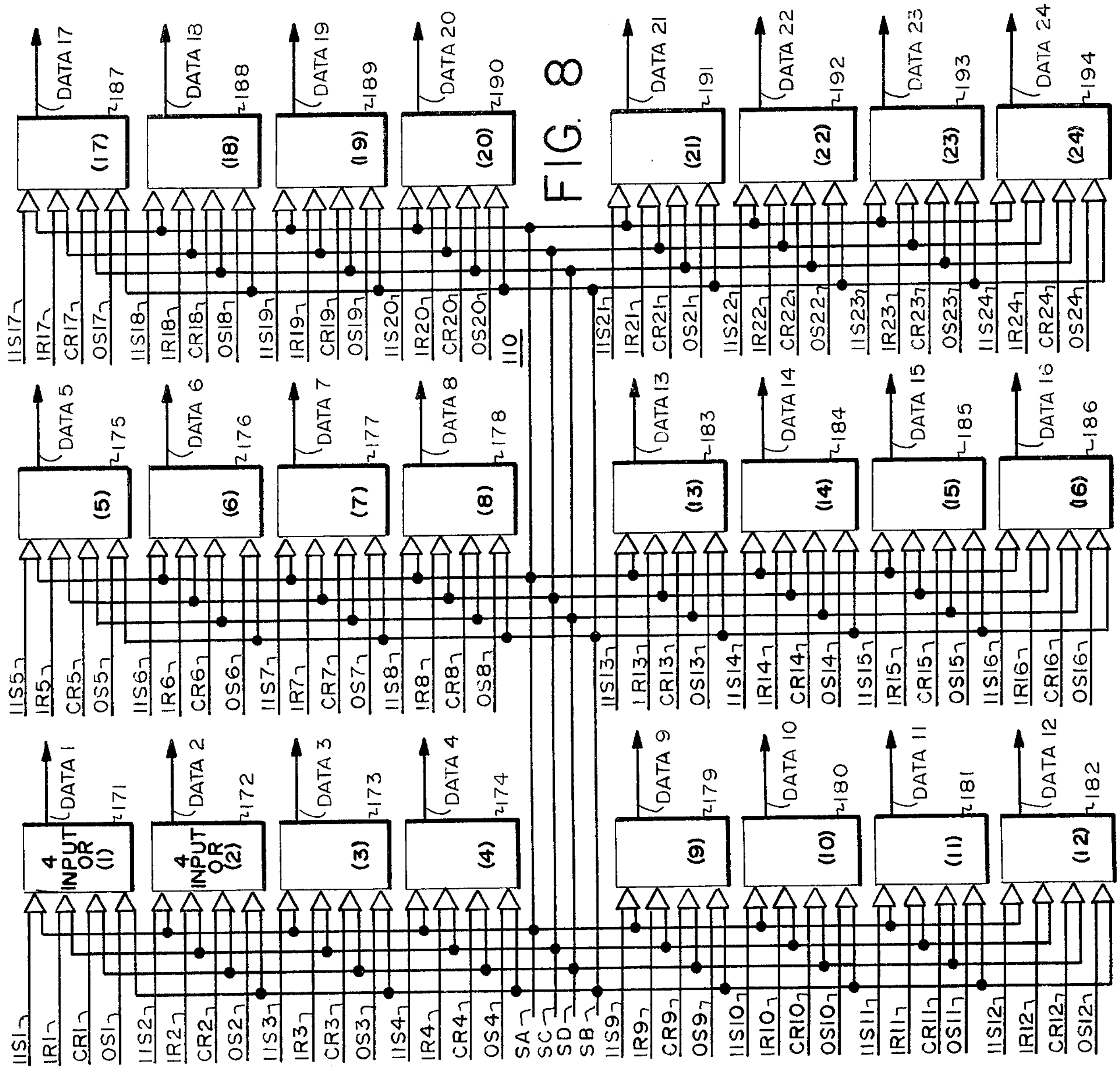
FIG. 8 is a logic representation of another portion of the gating and busing circuit for the scan and control circuit.
Figure 7:
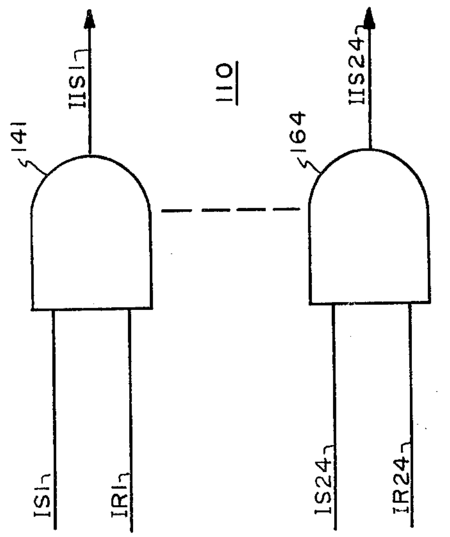
FIG. 7 is a logic representation of a portion of a gating and busing circuit for the scan and control circuit.

FIGS. 7 and 8 show logic circuitry of the gating and busing logic 110. In FIG. 7, there is shown 24 2-input AND logic gates 141 through 164 that are provided with the 24 output signals IS1 through IS24 of the ISR 60 and the 24 output signals IR1 through IR24 of the inhibit register IR 80. The 24 corresponding logic output signals are shown as IIS1 through IIS24. It can be seen that an inhibit function can be provided through the provision of a negative logic state to any one of the AND logic gates 141–164. The output signals IIS1 through IIS24 are provided to the logic circuitry of FIG. 8 for access by the CPU 30 when the access enablement signal SA is provided from the decoder circuit 100. The logic circuitry of FIG. 8 has for its functional purposes to multiplex the 24 separate channels of incoming IIS1–IIS24 and outgoing OS1–OS24 signaling for presentation to the CPU 30, and to provide the gating necessary to select a 24-bit word on the output data leads DATA 1 through DATA 24 from any selected one of the four registers IR 80, CR 90, ISR 60 and OSR 70 as required.

FIG. 8 shows 24 separate logic assemblies 171 through 194, each comprised of four 2-input AND gates feeding a 4-input OR logic gate, and the outputs thereof are shown as DATA 1 through DATA 24. From a consideration of FIG. 8, it can be seen that with the provision of a selected one of the read access enablement signals SA, SB, SC or SD, that a 24-bit data word will be provided to the CPU 30 to give the read-outs of the ISR 60, OSR 70, IR 80 and CR 90, respectively. If, for example, incoming channel 5 goes off-hook, the change in signaling status is provided to the CPU 30 through the next to-be-read data word from the ISR 60. The CPU 30 initiates an inhibit through the data signal A5 which results in a negative logic state for the IR 5 inhibit signal.

Figure 9:
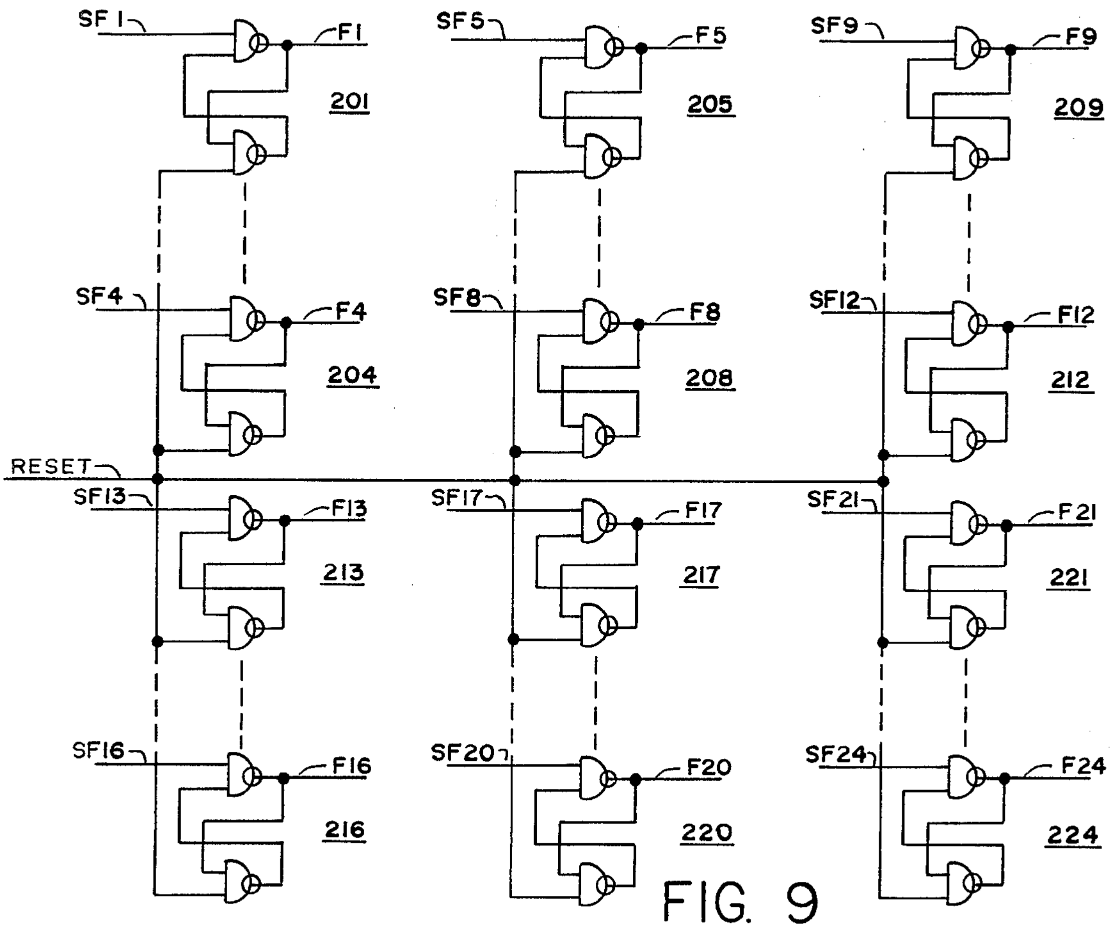
FIG. 9 is a logic representation of a portion of the inhibit register unit.
Figure 10:
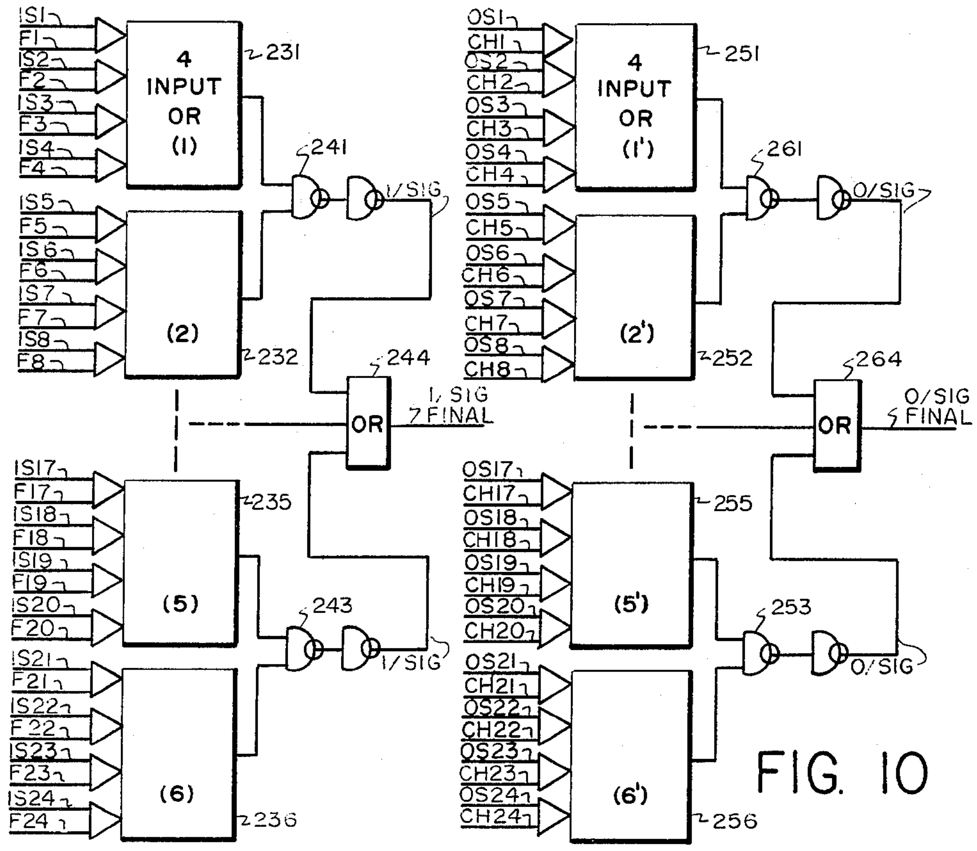
FIG. 10 is a logic representation of other portions of the ihibit register unit and the control register unit.

FIGS. 9 and 10 show logic circuitry located within the ISR 60 and OSR 70 register units to provide supervision through signaling to and from the switching network 37. As was earlier stated, the signals SF1–SF24 are developed within the gating of FIG. 3 and are provided to the gating circuitry shown in FIG. 9. There is shown in FIG. 9, 24 flip-flop circuits 201 through 224 which provide 24 outputs F1 through F24 which comprise enablement signals to the six logic assemblies 231 through 236, each of which is comprised of four 2-input AND gates feeding a 4-input OR logic gate. The logic outputs of the gates 231–232, 233–234 and 235–236 are paired through three 2-input logic gates 241 through 243 and the outputs thereof are provided to a 3-input OR logic circuit 244 which in turn provides a final input supervision (on-hook or off-hook) I/SIG FINAL signal to the network 37.

There is also shown in FIG. 9 six other logic assemblies 251 through 256, each of which is comprised of four 2-input AND gates feeding a 4-input OR logic gate. The inputs thereto are seen to be the 24 output signals OS1–OS24 and the timing signals CH1–CH24 for the 24 channels of a time frame. The logic outputs of the gates 251–252, 253–254 and 255–256 are paired through three 2-input logic gates 261 through 263 and the outputs thereof are provided to a 3-input OR logic 264 which provides a final output supervision signal O/SIG FINAL to the outgoing line equipment 22.

The alarm simulator circuit 53 is provided as a part of the supervisory scan and control system 24 and it is intended to function with the master switching exchange to complement the line equipment grouping much the same as present day alarm circuits are provided in terminal equipment locations. The alarm simulator circuit 53 is directly interfaced with the CPU unit 30 through the PU bus 34. The alarm circuit 53 provides a system alarm receive SAR signal, a system alarm transmit SAT signal and a 10 ms alarm signal through the circuit arrangement shown in FIG. 11. The SAR alarm indicates a loss of framing (synchronization) for more than 350 microseconds of the received T1 carrier information, e.g., to the appropriate line equipment. The SAT alarm indicates a loss of framing which has persisted for more than some selected time period such as 1 second. The SAR alarm is intended to make the CPU 30 aware that the integrity of the information being received is not acceptable. If the out-of-frame condition persists, as is detected by the frame detector circuit within the line synchronizer 33, the SAT alarm is used to transmit an indication back to the transmitting terminal equipment that loss of synchronization has occurred.

The SAT alarm is accomplished by the inhibition of an assigned digit, such as 1 and 8 for the D1 channel bank equipment or digit 2 for the D2 channel bank equipment The 10 ms alarm is used as the first alarm to occur when loss of synchronization occurs. Since the CPU unit 30 repeats its monitoring cycle for a given line equipment grouping approximately each 10 ms, the purpose of the 10 ms alarm is to signal the CPU 30 to discount the received PCM information during a loss of frame condition.

Figure 11:
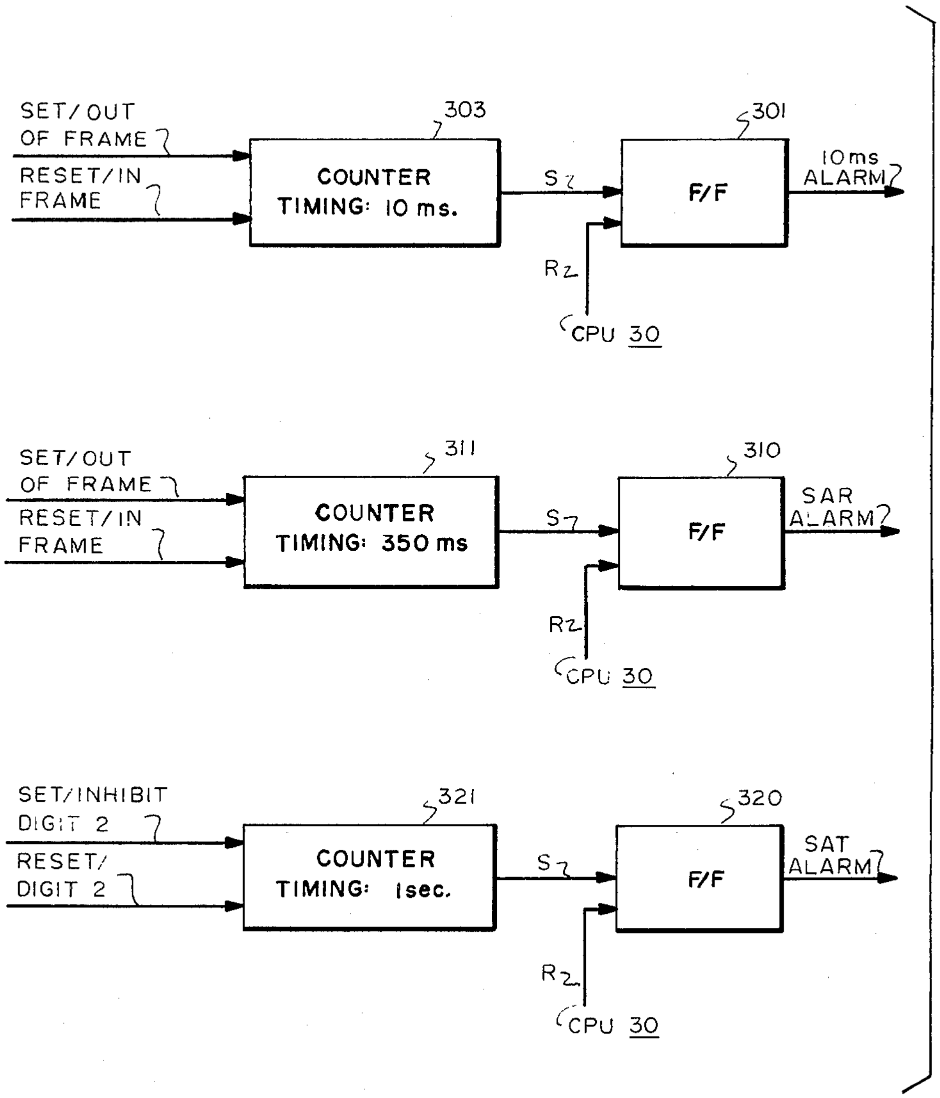
FIG. 11 is a block diagram of an alarm simulator circuit which comprises another part of the supervisory scan and control system.

FIG. 11 shows the fundamental elements required to generate the three alarm signals of the alarm simulator circuit 53. As shown, the 10 ms alarm signal is generated by the output of a set/reset flip flop 301 which in turn is set by a counter 303 beginning its counting operation when triggered by the detection of an out-of-frame condition. If an in-frame condition is detected to re-occur with 10 ms, the counter 303 is reset and there is no 10 ms alarm signal generated. If the framing is not restored within 10 ms, the 10 ms alarm occurs. The 10 ms alarm can be reset by the CPU 30 as shown in FIG. 10, or the CPU 30 can force the generation of the 10 ms alarm by simulating loss of framing, if desired.

The SAR alarm signal is generated by an identical circuit arrangement including a set/reset flip flop 310 and counter 311 timed for 350 ms. When an out-of-frame condition does occur and then persists for greater than some 350 ms (approximate duration of 8 consecutive digits or bits), the SAR alarm occurs. The SAR alarm can be reset by the CPU 30 as shown in FIG. 10 or the CPU 30 can force the generation of the SAR alarm, if desired. The SAT alarm signal is likewise generated as can be seen from the circuit arrangement of FIG. 11 including a flip flop 320 and a 1 second counter 321, except that the enabling SET signal to the counter 321 is the absence of digit 2 (D2 format) for a time greater than 1 second. The SAT alarm can be reset by the CPU 30 or forced on by the CPU 30, if desired. The alarm signals SAR, SAT and 10 ms are used to initiate a given sequence of events, namely, where a PCM communication system has a plurality of terminal equipments interconnected with a master PCM switching exchange, each in a closed loop communication arrangement, the alarm signals are necessary to precipitate a disconnect of all one-way and/or two-way trunks from existing service for the duration of the loss of synchronization, and the provision of a time delay required for trunk disconnect and trunk restoral to service following in frame restoration.

It should be understood that the data bus format contains additional bit positions assigned to SAT and SAR alarm conditions in addition to the 24 bit positions required for channel signaling. In a closed loop system involving two distant terminal line equipments, say M and N, the control of the carrier group alarm circuit of one of M and N is independent of the other of M and N so long as the associated carrier system consists of one-way trunk service therebetween. When the carrier system consists of two-way trunk service, the operations of the two carrier group alarm circuits must be synchronized in order to insure essentially simultaneous restoral of each line equipment group. It is to be noted that the inhibiting of digit 2 within the eight word format, is conveniently selected to indicate a loss of synchronization at the distant line equipment group. Now, when the digit 2 is being inhibited by line equipment M, the persistence of the loss of digit 2 for more than one second at terminal N causes the transmit SAT alarm. When terminal M receives framing again the inhibit is immediately removed from the transmit of digit 2 to the terminal N, and a 10 second restoral timer, such as a 10 second delay logic circuit, is started.

When terminal N again receives digit 2, another 10 second restoral timer is started after which the SAT alarm condition is removed. Obviously, this simultaneous restoral is not required for one-way trunk service. Where two-way trunk service is provided, the terminal M and N alarm circuits are synchronized to provide simultaneous restoral at both end terminals. Thus, the alarm sequence insures the disconnecting and busying of both terminals M and N from the central office for a minimum of 20 seconds whenever framing is discontinued for more than 350 msec at either or both terminals M and N. A two-way failure of SAR and SAT at a given terminal follows a similar sequence now thought to be apparent from the above explanation except that when the last of the two terminals M and N receives framing again, the restoral sequence is initiated.

As earlier stated, the group equipment 26 and 28 is capable of processing parallel arranged information much faster than a single line equipment group can provide such data. Hence, the group equipment multiplexes eight line equipment groups and presents the multiplexed information on an 8-bit parallel bus to the switching network 37. For a synchronous switching system, the switching network 37 requires the parallel data from the eight line equipments to be aligned for simultaneous switching at the crosspoints. The data from any one of the eight line equipments is presented to the switching network for substantially one pulse position (650 usec).

It is possible to locate line equipments at a considerable distance from its associated group equipment, thus requiring that any propagation delay be accounted for when the parallel information is presented to the crosspoints. One technique to accomplish this would be to present the data to be switched in sequence from each line equipment just one pulse position before it is required at the particular group equipment. However, this would result in separate timing pulses for each line equipment and a preferred technique would be to divide the eight line equipments into two line groups. A first line group would contain four line equipments and correspond to pulse positions 1–4, and similarly, a second line group would contain another four line equipments corresponding to pulse positions 5–8. Then, the first line group would be made available in parallel form at the group equipment during pulse position seven and hence, provide adequate time to compensate for propagation delay. Thus, the two sets of line groups are offset by some four pulse positions and require only two separate timing pulses. The outgoing group equipment 28 receives parallel data from the switching network 37 by receiving the data into the register 46. Data out of register 46 is presented to all eight line equipments, each of which accept its own information every channel during the appropriate time. The multiplexed information is not demultiplexed by the outgoing group equipment but is demultiplexed by the sequential acceptance of the parallel data out into the outgoing line equipments.

It is to be noted that very little disclosure has been set forth with respect to the development of the various timing signals utilized within the line equipment and group equipment as such derivation of timing signals is well known. For example, pulse position decoder means, frame detecting means and a suitable timing generator synchronized to a master exchange clock oscillator can be provided. It is also to be understood that while the present invention has been shown and described with respect to a preferred embodiment thereof, the scope of the invention is not intended to be so limited and other equally suitable and equivalent modifications and changes may be made therein without departing from the spirit and scope of the invention.

What is claimed is:

1. In a digital telecommunication switching system having incoming and outgoing digital information processed through a PCM switching network under the operation of a common control complex including a call processor unit, a supervisory scan and control system comprising first and second register store means connected to receive preselected portions of said incoming and outgoing digital information, respectively, said first and second register store means providing first and second output signals, respectively, upon each occurrence of said preselected portions of received incoming and outgoing digital information, each of said first and second output signals being re-inserted into said incoming and outgoing digital information being processed to and from the switching network, respectively, third output signals from said first register store means collectively providing the digital states of a plurality of said preselected portions of incoming information and being selectively connected to said call processor unit for providing thereto first read access means of said digital states, fourth output signals from said second register store means collectively providing the digital states of a corresponding plurality of said preselected portions of outgoing information and being selectively connected to said call processor unit for providing thereto second read access means of said digital states, third and fourth register store means connected to said call processor unit and being selectively enabled thereby to provide fifth and sixth output signals, respectively, at least corresponding to a change in digital state of predetermined ones of said preselected portions of incoming information, said fifth and sixth output signals being effective to inhibit further changes of digital state for said predetermined ones of said preselected portions of incoming information and for predetermined ones of said preselected portions of outgoing information, respectively, logic means selectively connecting said third, fourth, fifth and sixth output signals to said call processor unit, and address decoder means connecting said call processor unit to said logic means and providing logic command signals to selectively enable said connection of the third, fourth, fifth and sixth output signals to the call processor unit.

2. A supervisory scan and control system as claimed in claim 1 wherein said incoming digital information includes a framing signal pattern used for detecting in-frame and out-of-frame conditions and said supervisory scan and control system includes first and second counter alarm means activated by receipt of an out-of-frame signal to count the duration of said out-of-frame condition, said first counter alarm means providing a first alarm signal with said count thereof achieving a first preselected count level and said second counter alarm means providing a second alarm signal with said count thereof achieving a second preselected count level, said second count level being greater than said first count level.

3. A supervisory scan and control system as claimed in claim 2 wherein an identifiable disable code pattern is insertable into said incoming digital information and said supervisory scan and control system further includes third counter alarm means activated by receipt of said disable code pattern to count the duration thereof and to provide a third alarm signal with said count achieving a third preselected count level greater than said second count level, said first alarm signal signaling said call processor unit to discount incoming digital information during said out-of-frame condition, said second alarm signal comprising a system alarm receive signal effective to activate a disconnect of said incoming digital information for a predetermined time period and said third alarm signal comprising a system alarm transmit signal effective to activate the transmission of said identifiable disable code pattern through inclusion thereof in said outgoing digital information.

4. A supervisory scan and control system as claimed in claim 1 wherein said incoming and outgoing digital information comprises a frequency synchronized digital PCM carrier pulse train including both message related data and non-message related data and arranged in repeating time frames each having a plurality of channel time slots, said preselected portions of said incoming and outgoing digital information as connected to said first and second register store means, respectively, includes only said non-message related data and each preselected portion thereof comprises the non-message data of a channel time slot, said first and second register store means including pluralities of register store circuits, respectively, each plurality thereof corresponding to the plurality of channel time slots within a single one of said repeating time frames, said register store circuits of said first and second register store means providing said third and fourth output signals for selective connection to said call processor unit, respectively, and said first and second output signals comprise non-message related data.

5. A supervisory scan and control system as claimed in claim 4 wherein said third and fourth register store means are connected to receive a plurality of digital data bits from said call processor unit, respectively, and thereupon provide a corresponding plurality of fifth and sixth output signals, respectively, said plurality of data bits corresponding to the plurality of channel time slots of each time frame, said third and fourth output signals from said pluralities of first and second register store circuits, respectively, being of the identical digital states of the non-message data received during the plurality of channel time slots of the incoming and outgoing digital information, respectively, said digital data bits connected to said third and fourth register store means having selected digital states representative of the digital states of said third and fourth output signals, respectively, and effective to provide predeterminable digital states for said fifth and sixth output signals, respectively, selected ones of said predeterminable digital states of said fifth output signals being effective with the occurrence of a change in digital state of the non-message data during any channel time slot of incoming information to inhibit further changes of digital state for other selected ones of said first and third output signals, respectively, selected ones of said predeterminable digital states of said sixth output signals being effective with the occurrence of a change in digital state of the non-message data during any channel time slot of outgoing information to control the digital state for other selected ones of said second and fourth output signals, respectively, said selected ones of said fifth and sixth output signals and said other selected ones of said first and third output signals and said second and fourth output signals, respectively, all being assigned to corresponding ones of said channel time slots.

6. A supervisory scan and control system as claimed in claim 5 wherein said fifth and sixth output signals are selectively connected by said logic means to said call processor unit for providing thereto third and fourth read access means of said digital states thereof, respectively, and said logic command signals of said address decoder means are comprised of four read access logic commands which enable said first through said fourth read access means, respectively, and two write logic commands which enable said third and said fourth register store means to provide said fifth and sixth output signals, respectively.

7. A supervisory scan and control system connectible between a common control call processor unit and the telephone line and group equipment of a PCM digital switching network, said line equipment and group equipment processing to and from said PCM switching network a transmitted frequency synchronized digital PCM carrier pulse data train carrying both message related data and non-message related data and arranged in a repeating time frame format, said scan and control system comprising in combination: alarm circuit means interconnected with said call processor unit and with line equipments incoming and outgoing with respect to the switching network for receiving out-of-frame signals therefrom upon loss of timing synchronization of said PCM pulse data train and providing an alarm condition indicatiive thereof, and a supervisory scan and control circuit interconnected with said call processor unit and including first and second register store means connected to said incoming and outgoing line and group equipments for receiving non-message related data therefrom, respectively, each thereof providing said call processor unit with a first digital output signal corresponding to each occurrence of said received non-message data, third register store means interconnected with said first register store means for selectively inhibiting further changes of digital state of preselected ones of said first outputs thereof during signaling transmission periods occurring subsequently to said preselected first outputs having been provided to said call processor unit, fourth register store means interconnected with said second register store means for selectively inhibiting further changes of digital state of said first outputs thereof during said signaling transmission periods, logic means selectively interconnecting said first through said fourth register store means with each other and with said call processor unit for providing connection means by which said first through said fourth register store means is selectively accessed by said call processor unit, and decoder means connected to said call processor unit and to said logic means for decoding address instructions of said call processor unit to selectively enable the interconnection of said logic means with said first through said fourth register store means.

8. A supervisory scan and control system as claimed in claim 7 wherein said first and second register store means comprise input and output signaling registers, respectively, each of which are provided with a plurality of register store circuits corresponding in number to the plurality of data channels presented by said PCM pulse data train, timing means for selectively activating said register store circuits as said channel periods occur, said third and fourth register store means comprise an incoming dial pulse inhibit register and an outgoing signal control register, respectively, each of which are provided with a plurality of register store circuits corresponding in number to the plurality of input and output register store circuits, data word means inputted from said call processor unit to said inhibit and control registers for identifying a selected one of said input and output register store circuits to be inhibited, respectively, and address word means inputted from said call processor unit as address instructions to said decoder means for identifying a selected one of said first through said fourth register store means to be accessed by said call processor unit.

9. A supervisory scan and control system as claimed in claim 7 wherein said alarm circuit means comprises first counter means activated by loss of framing for said received PCM pulse data train and second counter means activated by a preselected code insertable into said PCM pulse data train, said first and second counter means providing alarm outputs therefrom responsive to said first and second counter means being operational for a predetermined length of time.

10. A supervisory scan and control system as claimed in claim 9 wherein said first counter means provides a first alarm output when said loss of framing exceeds a first count level and a second alarm output when said loss of framing exceeds a second, greater count level, and said second counter means provides a third alarm output when said preselected code is detected for in excess of a third, still greater count level.

11. A supervisory scan and control system as claimed in claim 10 wherein said second alarm output is a system alarm receive signal effective to activate a disconnect of all incoming PCM pulse data for a preselected time period and to activate the supply of said preselected code to said second counter means, and said third alarm output is a system alarm transmit signal effective to instruct another PCM network of the loss of synchronization at said one PCM switching network.

12. A supervisory scan and control system as claimed in claim 10 wherein said first count level is approximately 10 milliseconds.

13. A supervisory scan and control system as claimed in claim 10 wherein said second count level is approximately 350 milliseconds.

14. A supervisory scan and control system as claimed in claim 10 wherein said third count level is approximately one second.

15. A supervisory scan and control system connectible between a common control call processor unit and the incoming and outgoing telephone line equipments of a PCM digital switching network operating under the data and address control of said call processor unit to switch both message and non-message related data of a PCM carrier train, said supervisory scan and control system comprising in combination: logic gating means having a first set of output data signals to be connected to said call processor unit, first and second register store means connected to said incoming line and said outgoing line equipments for receiving incoming and outgoing non-message data, respectively, each thereof providing a non-message digital signal corresponding to each occurrence of said received non-message data, a collective plurality of said non-message digital signals from each of said first and second register store means comprising first and second sets of digital output signals and being provided to said logic gating means to selectively comprise said first set of output data signals, third register store means receiving data instructions from said call processor unit and then providing a third set of digital output signals in response thereto, said third set of digital output signals being connected to said logic gating means to enable said logic gating means to inhibit subsequent changes of digital state of selected ones of said first set of digital output signals and to selectively comprise said first set of output data signals, fourth register store means receiving data instructions from said call processor unit and then providing a fourth set of digital output signals in response thereto, said fourth set of digital output signals being connected to said second register store means to enable the same to inhibit subsequent changes of digital state of selected ones of said second set of digital output signals and to selectively comprise said first set of output data signals, and address decoder means receiving address instructions from said call processor unit and providing logic command signals connected to said logic gating means to selectively enable said first through said fourth sets of digital output signals to comprise said first set of output signals to said call processor unit.

16. A supervisory scan and control system as claimed in claim 15 wherein said logic command signals are comprised of four read command signals which enable said logic gating means to selectively release said first through said fourth sets of digital output signals as said first set of output data signals, respectively, and to write command signals which enable said third and fourth register store means, respectively, to selectively provide said third and fourth sets of digital output signals.

* * * * *

UNITED STATES PATENT OFFICE
CERTIFICATE OF CORRECTION

PATENT NO. : 3,920, 921

DATED : November 18, 1975

INVENTOR(S) : SATYAN G. PITRODA, MICHAEL J. KELLY

It is certified that error appears in the above-identified patent and that said Letters Patent are hereby corrected as shown below:

Column 21, line 31, delete "of" and insert -- from --

Column 22, line 66, after "output" insert -- data --

Column 23, line 4, delete "to" and insert -- two --

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*